United States Patent [19]

Hettinger

[11] Patent Number: 4,471,063
[45] Date of Patent: Sep. 11, 1984

[54] METHOD AND APPARATUS ARRANGEMENT FOR REGENERATING FLUID PARTICLES OF CATALYST

[75] Inventor: William P. Hettinger, Russell, Ky.
[73] Assignee: Ashland Oil, Inc., Ashland, Ky.
[21] Appl. No.: 435,836
[22] Filed: Oct. 21, 1982
[51] Int. Cl.³ .................. B01J 29/38; B01J 21/20; C10G 11/18
[52] U.S. Cl. .................. 502/39; 48/197 R; 208/164; 422/144; 502/40; 502/43
[58] Field of Search ............... 252/417, 419; 208/164; 422/144; 506/39, 40, 42, 43

[56] References Cited

U.S. PATENT DOCUMENTS

| | | | |
|---|---|---|---|
| 2,398,739 | 4/1946 | Greensfelder | 252/417 |
| 2,414,002 | 1/1947 | Thomas | 208/164 |
| 2,434,567 | 1/1948 | Jahnig | 208/155 |
| 2,475,650 | 7/1949 | Thompson | 502/43 |
| 2,905,622 | 9/1959 | McCarthy | 252/411 R |
| 3,197,284 | 7/1965 | Hoekstra | 252/419 |
| 3,494,858 | 2/1970 | Luckenbach | 422/144 |
| 3,563,911 | 2/1971 | Pfieffer | 502/43 |
| 3,821,103 | 5/1974 | Owen | 208/72 |
| 3,856,659 | 12/1974 | Owen | 208/80 |
| 4,010,003 | 3/1977 | Pulak | 422/144 |
| 4,057,397 | 11/1977 | Gross | 422/144 |
| 4,118,337 | 10/1978 | Gross | 502/40 |
| 4,176,084 | 11/1979 | Luckenbach | 252/417 |
| 4,219,442 | 8/1980 | Vickers | 502/40 |
| 4,388,218 | 6/1983 | Rowe | 252/417 |

Primary Examiner—P. E. Konopka
Attorney, Agent, or Firm—Richard C. Willson, Jr.; C. William Crady

[57] ABSTRACT

The present invention is directed to a method and sequence of processing steps within an apparatus arrangement comprising two separate fluidized relatively dense catalyst beds undergoing regeneration to remove carbonaceous deposits wherein catalyst particles are circulated between catalyst beds to transfer heat from one bed to another and transfer partially regenerated catalyst from one bed to a second heat generating catalyst bed, said catalyst regeneration system arranged to maintain a desired heat balanced temperature restriction less than 787° C. (1450° F.) and the generation of a $CO_2$ rich flue gas with utilization thereof to achieve reaction with carbon form carbon monoxide under endothermic reaction temperature conditions.

10 Claims, 1 Drawing Figure

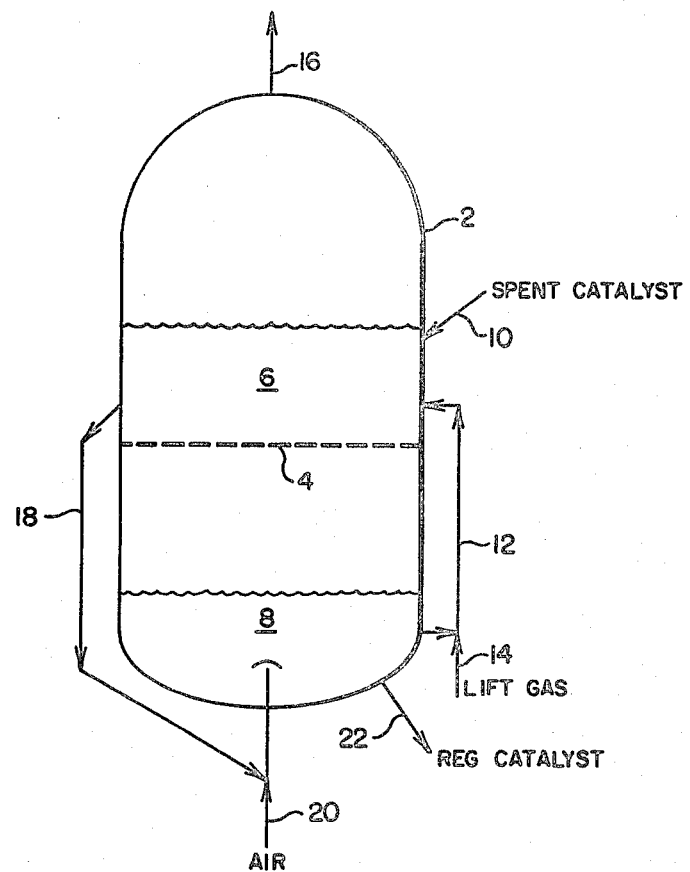

METHOD AND APPARATUS ARRANGEMENT FOR REGENERATING FLUID PARTICLES OF CATALYST

BACKGROUND OF THE INVENTION

The metals content and Conradson carbon values of a hydrocarbon feed material and particularly high boiling feeds comprising residual oils and reduced crudes are two very effective restraints on a hydrocarbon conversion operation and impose some considerable restraints in a reduced crude cracking operation with respect particularly to the catalyst regeneration operation.

The effect of increased Conradson carbon in a high boiling hydrocarbon feed material is to increase that portion of the feed converted to coke or carbonaceous material deposited on the catalyst particles. In a gas oil cracking operation, the amount of coke deposited on the catalyst is generally in the range of 4-5 weight percent of the feed. This coke deposition is attributed to four different coking mechanisms, namely, contaminant coke from adverse reactions caused by metal deposits, catalyst coke caused by acid site cracking, entrained hydrocarbons resulting from pore structure absorption, poor stripping operations and the Conradson carbon level of the feed resulting from pyrolytic distillation of hydrocarbons in the conversion zone. When processing reduced crudes there are two additional sources of coke contributed by adsorbed and absorbed high boiling hydrocarbon components which do not vaporize at the conversion conditions employed and therefore are also not removed by lower temperature stripping conditions. The second source is contributed by high molecular weight nitrogen containing hydrocarbons adsorbed on the catalyst acid sites. Thus when processing high boiling residual oils, the coke production is based on a summation of the six different methods above defined. Thus the coke production when processing reduced crudes may be estimated as approximately 4 weight percent of the feed plus the Conradson carbon value of this heavy or high boiling feed to be processed.

The catalyst thus coked is brought back to equilibrium activity by removal of deposited carbonaceous material in a regeneration zone normally in the presence of air or oxygen containing gas. The heat generated during such regeneration is removed in part by regeneration flue gas and in part by the catalyst. The regeneration temperature is normally restricted to less than 815° C. or 760° C. (1500° F. or 1400° F.) in the prior art to avoid hydrothermal deactivation of the catalyst and destruction of apparatus equipment relied upon for this purpose.

The hydrothermal stability of a zeolite catalyst is determined by the temperature and steam partial pressure at which the zeolite begins to rapidly loose its crystalline structure to yield a lower activity amorphous material. The presence of high temperature steam in the regenerator is highly undesirable and is generated by the burning of adsorbed and absorbed hydrocarbonaceous material which has a significant hydrogen content (hydrogen to carbon atomic ratios generally greater than about 0.5). Residual oils and reduced crudes comprise materials which do not vaporize at temperatures below 566° C. (1050° F.) but comprise materials of higher boiling points up to as high as 815°-926° C. (1500°-1700° F.) and higher of modest hydrogen content. These high boiling materials include high molecular weight materials such as prophyrins, asphaltenes and nitrogen compounds which may be basic or acidic in nature.

Thus as the end point of the feed increases above 552° C. (1025° F.) so does the carbon producing tendency of the feed also increase to the point that the catalyst particles accumulate heavy deposit of carbonaceous material. The present invention is directed to a method for regenerating catalyst particles comprising relatively heavy hydrocarbonaceous deposits contributed by hydrocarbon feeds of substantial Conradson carbon value.

Some prior art patents considered in the preparation of this application include the following listed patents.

| Thomas et al 2414002 | Thompson et al 2475650 |
|---|---|
| Greensfelder et al 2398739 | Pfeiffer et al 3563911 |
| Jahnig et al 2434567 | Gross et al 4118337 |
| Luckenbach 4176084 | Pulak 4010003 |
| Gross et al 4057397 | Vickers 4219442 |
| Owen 3856659 | Owen 3821103 |

SUMMARY OF THE INVENTION

The present invention is directed to accomplishing regeneration of fluid catalyst particles comprising hydrocarbonaceous deposits in at least two sequentially arranged dense fluid bed contact zones of endothermic heat utilization in at least one zone and exothermic heat generation in another zone in combination with catalyst circulation between zones and maintained under exothermic temperature regeneration conditions within the range of about 704° C. (1300° F.) up to 843° C. (1550° F.).

In order to maintain a proper heat balanced catalyst regeneration operation with catalyst temperature limits restricted as herein provided, it is considered essential that catalyst particles comprising high levels of carbonaceous deposits comprising hydrogen and obtained from a hydrocarbon conversion operation be at least partially regenerated under endothermic conditions to yield carbon monoxide rich flue gases before effecting exothermic regeneration at conditions restricted not to exceed about 843° C. (1550° F.). To accomplish this sequence of regeneration steps and at the same time obtain substantially complete removal of deposited carbonaceous material from the catalyst particle, applicant proposes to accomplish at least initial partial removal of hydrocarbonaceous deposits in the range of about 40 to about 80% under essentially endothermic catalyst regeneration conditions in the presence of carbon dioxide rich gases and complete the removal of any residual carbon material with oxygen containing gas in an adjacent zone under exothermic temperature regenerating conditions selected to produce a carbon dioxide rich flue gas comprising unconsumed oxygen containing gas. In this catalyst regeneration operating environment it is intended to accomplish this exothermic operation within a fluidized catalyst bed comprising residual carbon to obtain substantially complete combustion thereof and any formed carbon monoxide rather than experience dispersed catalyst phase after burning of carbon monoxide which permits undesired temperature excursions in the dispersed phase catalyst. More particularly, the catalyst regeneration sequence of this invention is accomplished by utilizing at least two separate dense fluid catalyst beds in sequential arrangement and maintained in one or more regeneration vessel such as separate sequentially arranged regeneration vessels with provisions for recycling catalyst as herein defined and the transfer of high temperature $CO_2$ rich flue gas from said exothermic stage of regeneration to said endothermic stage of catalyst regeneration. That is, it is proposed to pass hot regenerated catalyst of little or no residual carbon from said exothermic catalyst regeneration stage suspended in $CO_2$ rich gas, air or other suitable fluidizing transport gas to said catalyst bed comprising said endothermic stage of catalyst regeneration for admixture with spent catalyst particles comprising carbonaceous deposits also charged thereto to provide a mixed catalyst bed phase at an elevated temperature sufficient to aid achieving the endothermic reaction of carbon dioxide with carbonaceous material on the spent catalyst to produce CO. Additional heat is provided the spend fluid catalyst bed phase by charging high temperature $CO_2$ rich flue gas comprising oxygen of the exothermic catalyst regeneration operation to the introduced spent catalyst bed phase or first stage of catalyst regeneration. Thus in this catalyst regeneration sequence it is contemplated maintaining endothermic regeneration temperature in said first stage of catalyst regeneration within the range of 704° C. (1300° F.) up to about 843° C. (1550° F.) and in said second stage of exothermic oxygen regeneration the temperature is restricted to within the range of 704° C. to about 843° C. (1300° F. to about 1550° F.). The second stage exothermic regeneration temperature may be equal to or greater than the first stage regeneration operation and the temperature spread provided will be dependent upon the spent catalyst level of carbonaceous deposits, the amount removed under endothermic reaction conditions and the amount removed under subsequent exothermic reaction conditions without exceeding a catalyst regeneration temperature of about 843° C. (1550° F.).

It will be recognized by those skilled in the art that due to the fact that some unconsumed oxygen containing gas will be charged to the first stage of regeneration with or without some CO in the $CO_2$ rich flue gas, that some partial combustion of carbonaceous deposits will also be experienced in said first stage of catalyst regeneration, which combustion will provide heat for promoting the reaction of $CO_2$ with carbonaceous material comprising hydrogen charged thereto with spent hydrocarbon conversion catalyst. However, it is intended that any such temperature contribution by oxygen combustion will be less than that required to provide the necessary endothermic heat of reaction as herein defined.

In the catalytic conversion of high boiling hydrocarbons generally boiling about about 343° C. (650° F.) and comprising materials identified as topped crudes, residual oils, reduced crudes and other appropriate nomenclature in a fluid catalytic cracking unit, the amount of carbonaceous material (coke) deposited on the fluid catalyst particle may be in considerable excess of that required for hydrocarbon endothermic conversion heat and for heat balance of the unit. This excess heat generation is attributed to the regeneration of the catalyst by combustion of hydrogen and large coke deposits with air which will yield appropriately high temperatures. This heat generation is supplemented by providing high $CO_2/CO$ ratios in the regeneration fluid gas. These generated high temperatures and high $CO_2/CO$ ratios are particularly caused by the need to regenerate the catalyst under conditions of substantially complete carbon combustion and provide low carbon values on the regenerated catalyst thereby maintaining relatively high catalyst particle cracking activity.

In order to maintain a regenerated catalyst temperature criteria not substantially above about 843° C. (1550° F.), the heat evolved by carbonaceous material combustion must be restricted to produce flue gases of high $CO/CO_2$ ratios. This is true since conversion of carbon to carbon monoxide rather than $CO_2$ releases only about 40% of the combustion heat available when burning to form $CO_2$. A control of the catalyst regeneration temperature in combination with obtaining substantially complete removal of carbonaceous deposits to maintain high catalyst activity for processing reduced crude type feeds can be achieved by following the concepts and sequence of catalyst regeneration steps herein defined.

In one particular embodiment a unitary regenerator vessel is provided which is horizontally separated by one or more vertically spaced apart perforated baffle members to provide at least an upper section and lower section. A dense fluid bed of catalyst particle to be regenerated as herein provided is maintained in a lower portion of each section with a more dispersed phase of catalyst maintained in an upper portion of each section. Catalyst cyclone separating means may be provided in the upper most dispersed catalyst phase. External transfer conduit means are provided for passing catalyst particles from said upper dense fluid bed of catalyst particles to a lower dense bed of catalyst particles and for passing catalyst particles in lift gas, $CO_2$, from said lower most dense fluid catalyst bed to said upper most bed of catalyst to which spent catalyst is charged. Withdrawal conduit means are provided for removing regenerated catalyst particles from said lower catalyst bed for passage to a hydrocarbon conversion zone such as a riser conversion zone for processing residual oils and residual crudes. Conduit means are also provided for charging spent catalyst particles recovered from hydrocarbon products of conversion after stripping thereof to said upper bed of catalyst being regenerated. In yet another embodiment, it is contemplated providing internal transfer conduits for achieving the flow of catalyst particles between beds as herein desired. In fact, more than one such transfer conduit such as two or more conduits may be relied upon to achieve desired transfer of catalyst particles between beds of catalyst as above provided and arranged to achieve more uniform dispersal of catalyst particles in the catalyst beds as desired. Providing more than one hot catalyst particle transfer conduits between the exothermic catalyst bed and the endothermic catalyst bed assures obtaining a more uniform temperature distribution in both of the beds of catalyst. Such temperature distribution may also be improved in the upper bed by mixing hot recycle catalyst particles with the spent catalyst particles before charging the mixture to the upper bed of catalyst for endothermic carbon removal with carbon dioxide as herein desired.

Arranging the catalyst beds one above the other and separated by a generally horizontal previous baffle member permits passing the partially oxygen depleted regeneration gas containing formed $CO_2$ hot flue gas product of coke combustion in the bottom bed of catalyst to pass from the lower dispersed catalyst phase into the dense fluid catalyst bed maintained in the upper regeneration section and referred to herein as the endothermic regeneration section. The spent catalyst separated from hydrocarbon conversion products and comprising residual hydrocarbonaceous deposits of high temperature stripping thereof at a temperature within the range of 482° C. (900° F.) up to about 593° C. (1100° F.) is passed into the upper dense phase of catalyst to be regenerated with the $CO_2$ rich gas mixtures in the presence of temperature yielding more completely regenerated catalyst recycled as herein provided. The $CO_2$ rich flue gas comprising unconsumed oxygen contacts the upper bed of catalyst under essentially endothermic reaction conditions so that substantial hydrocarbonaceous deposits on the charged spent catalyst is converted to carbon monoxide (CO) by the combustion reaction of incomplete oxygen according to the reaction $(2C+O_2 \rightarrow 2CO)$ and the endothermic reaction of carbon dioxide with carbon to yield carbon monoxide by the reaction $(CO_2+C \rightarrow 2CO)$ is particularly promoted. The combined reactions are promoted to remove in said upper catalyst bed at least 40 weight percent of the hydrocarbonaceous deposits from the spent catalyst particles so contaminated and charged thereto.

The partially regenerated charged spent catalyst particles in combination with the more completely regenerated recycled particles of catalyst are then passed to the lower bed of catalyst for substantially more complete removal of residual carbon from the spent catalyst particles by combustion with oxidizing gas such as air or other suitable oxygen containing gas suitable for the purpose. Under conditions particularly promoting the production of a $CO_2$ rich flue gas within the catalyst fluid bed phase. It will be recognized by those skilled in the art that the temperature of the lower bed of catalyst will be influenced by the amount of residual carbon to be removed therein, by the temperature and amount of catalyst needed for recycle to the upper bed of catalyst to assist with providing the required endothermic reaction heat therein and by operating conditions which will avoid thermal deactivation of the catalyst being regenerated.

The regeneration concepts of this invention and methods of accomplishing are particularly directed to accomplishing regeneration of a crystalline zeolite hydrocarbon conversion catalyst. More particularly, the regeneration technique herein defined is particularly directed to the regeneration of high activity conversion catalyst comprising a catalytically active rare earth exchanged crystalline zeolite in an amount in the range of 5 to 60 weight percent of the final catalyst particle composition and suitable for converting high boiling hydrocarbons such as residual oils and reduced crudes to provide more desirable lower boiling products comprising gasoline, light and heavy fuel oils. However, it will be understood that the regeneration techniques of this invention may be employed in any catalyst system irrespective of the catalyst employed, whether of low or high activity and where a temperature restriction is imposed to avoid hydrothermal damage to the catalyst particle employed or thermally damage the regeneration apparatus in which catalyst regeneration is accomplished. Thus, a temperature limitation during regeneration in one operating embodiment may be restricted not to exceed about 732° C. (1350° F.), or about 787° C. (1450° F.) in another embodiment or as high as 843° C. (1550° F.) in yet a third operating embodiment when employing a catalyst composition suitable for the purpose. The temperature restrictions are, therefore, dependent in substantial measure upon the catalyst thermal stability and metallurgical restrictions imposed by apparatus design.

BRIEF DESCRIPTION OF THE DRAWING

The drawing is a simplified diagrammatic arrangement of apparatus for practicing a two step regeneration operation according to the concepts of this invention. It will be recognized that flow control valves, temperature sensing means, cyclones and other operating equipment normally employed in a catalyst regeneration vessel system have not been shown to simplify the drawing. However, such equipment is intended to be a part of the apparatus employed to the extent required to provide acceptable operating apparatus.

DISCUSSION OF A SPECIFIC EMBODIMENT

Referring now to the drawing by way of example, there is shown vessel means 2, provided with a horizontal grid means or perforated baffle member 4, positioned across a mid-section of vessel 2 to provide an upper section comprising a dense fluid bed of catalyst 6 and a lower section comprising a dense fluid bed of catalyst 8. Spent catalyst particles comprising hydrocarbonaceous deposits of hydrocarbon conversion and recovered from a catalyst stripping zone at a temperature in the range of 482° C. to about 593° C. (900° F. to about 1100° F.) is charged to the upper catalyst bed 6 by conduit 10. Hot catalyst paticles which have been made more completely regenerated in catalyst bed 8 as herein provided is withdrawn from bed 8 by conduit 12, mixed with light gas such as air or $CO_2$ or a mixture thereof introduced by conduit 14 to form a suspension thereof which is passed to the catalyst bed 6 by conduit 12 for heat contributing admixture with the charged spent catalyst particles to form a mixed fluid bed of a temperature selected within the range of 704° C. (1300° F.) up to about 843° C. (1550° F.). Flue gas combustion products of oxygen combustion of residual carbon on catalyst in bed 8 and comprising particularly $CO_2$ at an elevated temperature above 704° C. (1300° F.) are passed from a dispersed catalyst phase above dense fluid bed 8 at a recovered elevated flue gas regeneration temperature up to about 843° C. (1550° F.) through grid or baffle 4 into the bottom portion of the upper dense fluid catalyst bed 6. The hot $CO_2$ rich flue gas comprising unconsumed regeneration gas such as air or other suitable oxygen containing gas as herein provided effect some partial combustion of the components of the hydrocarbonaceous deposits thereby contributing heat to the endothermic reaction of $CO_2$ with carbon to form CO particularly effected in the upper most fluid bed of catalyst. Thus a relatively delicate balance in operating parameters is necessitated in bed 6 to achieve heat dissipating restrictions through the combination of partial exothermic and endothermic removal of carbonaceous material from catalyst particles with $O_2$ and $CO_2$ to reduce the weight percent of coke on catalyst particles by at least 50 weight percent. Carbon monoxide rich flue gas products of the catalyst regeneration system accomplished in bed 6 are removed from the upper portion of the regeneration vessel by conduit 16 for disposal or use as desired such as in the generation of steam in an external waste heat boiler not shown or effect combustion and use thereof in power recovery equipment also not shown.

The spent catalyst particles partially regenerated in bed 6 as herein provided along with the more completely regenerated catalyst particles recycled thereto as recited above are withdrawn by conduit 18 for passage to the lower catalyst bed 8. In this embodiment the catalyst is mixed with regeneration air introduced by conduit 20 to form a suspension therewith which is then charged to a lower portion of the dense fluid catalyst bed 8. Additional regeneration air may be added across the bottom cross sectional area of catalyst bed 8 as required to complet removal of residual coke by means not shown. Combustion of residual carbon on catalyst particles charged to bed 8 is effected under conditions of temperature to reduce the level of residual carbon on catalyst particles to at least 0.05 weight percent and preferably at least about 0.25 weight percent. Regeneration of catalyst particles by combustion of residual carbon is temperature restricted preferably to within a range of 732° to 815° C. (1350° to 1500° F.) and more usually sufficiently elevated to provide the major heat source to the upper endothermic catalyst bed regeneration. The ratio of hot catalyst particles recycled from said lower catalyst bed to said upper catalyst bed or admixture with spent catalyst particles charged to said upper catalyst bed will be sufficient to supplement the heat provided by hot $CO_2$ rich flue gases and that provided by any partial combustion with oxygen in the upper bed of catalyst particularly promoted.

Catalyst particles regenerated to an elevated temperature up to 843° C. (1550° F.) or a lower selected temperature as above provided and of low residual carbon level particularly desired are withdrawn by conduit 22 for passage to a hydrocarbon conversion zone not shown such as a riser conversion zone for reuse in converting hydrocarbon feed materials to more suitable products.

It will be recognized by those skilled in the art of catalyst regeneration that a number of variations may be made to the apparatus arrangement of the drawing such as providing more than two catalyst beds without departing from the spirit and scope of the present invention.

Having thus generally described the regeneration concept of this invention and described a specific example in support thereof, it is to be understood that no undue restrictions are to be imposed by reasons thereof except as defined by the following claims:

I claim:

1. A method for regenerating catalyst particles containing hydrocarbonaceous deposits of hydrocarbon conversion which comprises:
   a. contacting spent catalyst containing hydrocarbonaceous conversion products admixed with completely regenerated catalyst particles in a first fluid bed catalyst regeneration zone with a heat contributing hot $CO_2$ rich flue gas product from step e below, at a temperature in the range of 704° C. (1300° F.) to about 843° C. (1550° F.), thereby removing from 40 to 80 wt% of the hydrocarbonaceous material from said spent catalyst under heat consuming endothermic regeneration conditions,
   b. passing catalyst particles comprising residual carbon from said endothermic regeneration zone to a separate second fluid bed catalyst regeneration zone,
   c. removing residual carbon from said catalyst in said second catalyst regeneration zone by combustion with oxygen containing gas under temperature conditions selected from within the range of 704 to 843° C. (1300° to 1550° F.) whereby a hot $CO_2$ rich flue gas is formed comprising some unconsumed oxygen containing gas,
   d. mixing hot catalyst particles obtained from said second zone of catalyst regeneration with spent catalyst particles charged to said first catalyst regeneration zone to sufficiently elevate the temperature in said first regeneration zone to aid said endothermic reaction,
   e. separately passing recovered hot $CO_2$ rich flue gas from said second regeneration zone directly in contact with spent catalyst in said first regeneration zone,
   f. recovering a CO rich flue gas from said first regeneration zone, and
   g. recovering regenerated catalyst at an elevated temperature from said second regeneration zone for passage to a hydrocarbon conversion zone.

2. The method of claim 1 wherein unconsumed oxygen containing $CO_2$ rich flue gas passed to said first regeneration zone is insufficient to provide by combustion the endothermic heat requirements thereof promoting the reaction of $CO_2$ with hydrocarbonaceous deposits to form a CO rich flue gas.

3. The method of claim 1 wherein hot catalyst particles of said second regeneration zone are mixed with the spent catalyst to form a high temperature dense fluid bed of catalyst in said first regeneration zone.

4. The method of claim 1 wherein hot catalyst particles are transported from said second catalyst regeneration zone to said first catalyst regeneration zone by a carrier gas separate from that entrained with hot $CO_2$ rich flue gases.

5. The method of claim 1 wherein the catalyst being regenerated in the first and second regeneration zones is maintained in a relatively dense fluid catalyst bed phase in each of said regeneration stages.

6. The method of claim 1 wherein the catalyst being regenerated is a crystalline zeolite catalyst of high initial activity and comprising in the range of from 5 to 60 weight percent of a rare earth exchanged crystalline zeolite of relatively large pore size openings.

7. The method of claim 1 wherein said from 40 to 80% of the carbonaceous deposits on the catalyst particles is removed by the combined reaction with $CO_2$ and oxygen in said first regeneration zone.

8. The method of claim 1 wherein at least 50% of the hydrocarbonaceous deposits are removed in the first stage of catalytic regeneration and the second stage of regeneration removes residual carbon on the catalyst by combustion to a residual carbon level not above about 0.05 weight percent.

9. The method of claim 1 wherein the transfer of particles of catalyst between the first and the second stages of regeneration is accomplished in an external transfer zone.

10. The method of claim 1 wherein the first and second catalyst regeneration zones are housed within a single vessel zone and separated from one another by a perforated baffle permitting the flow of gaseous material from the lower zone into the upper zone comprising said first catalyst regeneration zone and catalyst particles are transferred between said zones by one or more internal standpipe and riser transfer zones.

* * * * *